(12) United States Patent
Young et al.

(10) Patent No.: US 11,760,312 B2
(45) Date of Patent: Sep. 19, 2023

(54) WINDSHIELD WIPER BLADE

(71) Applicant: Pylon Manufacturing Corporation, Deerfield Beach, FL (US)

(72) Inventors: William Young, Parkland, FL (US); Jesus Yee, Boca Raton, FL (US)

(73) Assignee: PYLON MANUFACTURING CORPORATION, Deerfield Beach, FL (US)

( * ) Notice: Subject to any disclaimer, the term of this patent is extended or adjusted under 35 U.S.C. 154(b) by 36 days.

(21) Appl. No.: 17/407,961

(22) Filed: Aug. 20, 2021

(65) Prior Publication Data
US 2022/0176914 A1 Jun. 9, 2022

Related U.S. Application Data

(60) Provisional application No. 63/220,047, filed on Jul. 9, 2021, provisional application No. 63/068,856, filed on Aug. 21, 2020.

(51) Int. Cl.
*B60S 1/38* (2006.01)
*B60S 1/40* (2006.01)

(52) U.S. Cl.
CPC ........... *B60S 1/3851* (2013.01); *B60S 1/3849* (2013.01); *B60S 1/3856* (2013.01); *B60S 1/3867* (2013.01); *B60S 1/3881* (2013.01); *B60S 1/381* (2013.01); *B60S 1/3879* (2013.01); *B60S 2001/382* (2013.01); *B60S 2001/3812* (2013.01); *B60S 2001/3817* (2013.01)

(58) Field of Classification Search
CPC .... B60S 1/3851; B60S 1/3856; B60S 1/3849; B60S 1/3865; B60S 1/3867; B60S 1/3881; B60S 1/38; B60S 1/3801; B60S 1/40; B60S 2001/3812; B60S 2001/3817; B60S 2001/382; B60S 2001/3815; B60S 1/3879; B60S 1/381
USPC ............ 15/250.43, 250.44, 250.361, 250.47, 15/250.46
See application file for complete search history.

(56) References Cited

U.S. PATENT DOCUMENTS

| | | | |
|---|---|---|---|
| 2,616,113 A * | 11/1952 | Scinta | B60S 1/38 15/250.47 |
| 3,717,900 A * | 2/1973 | Quinlan | B60S 1/38 15/250.43 |
| 3,978,543 A * | 9/1976 | Tomlin | B60S 1/4064 15/250.44 |

(Continued)

FOREIGN PATENT DOCUMENTS

| | | | |
|---|---|---|---|
| DE | 933676 | * | 9/1955 |
| WO | 2007/142390 | * | 12/2007 |

*Primary Examiner* — Gary K. Graham
(74) *Attorney, Agent, or Firm* — BAKERHOSTETLER; John M. Mueller, Esq.

(57) ABSTRACT

A wiper blade may include a central connection device having an upper passage and a lower passage. An upper beam may be provided in the upper passage and a lower beam may be provided in the lower passage. The lower beam may also support a wiper strip. In use, the upper beam may forcibly contact the lower beam. A cover may be provided, and the cover may have an airfoil cross-sectional profile. A wiper blade assembly is also disclosed utilizing an embodiment of a wiper blade with a connector for connecting the wiper blade with a wiper arm of a vehicle.

15 Claims, 15 Drawing Sheets

(56) References Cited

U.S. PATENT DOCUMENTS

| | | | | |
|---|---|---|---|---|
| 4,063,328 A | * | 12/1977 | Arman | B60S 1/38 |
| | | | | 15/250.43 |
| 7,150,066 B1 | * | 12/2006 | Huang | B60S 1/381 |
| | | | | 15/250.43 |
| 7,503,095 B2 | * | 3/2009 | Lin | B60S 1/381 |
| | | | | 15/250.43 |
| 8,201,301 B2 | * | 6/2012 | Jeong | B60S 1/3882 |
| | | | | 15/250.361 |
| 8,397,341 B2 | | 3/2013 | Ehde | |

* cited by examiner

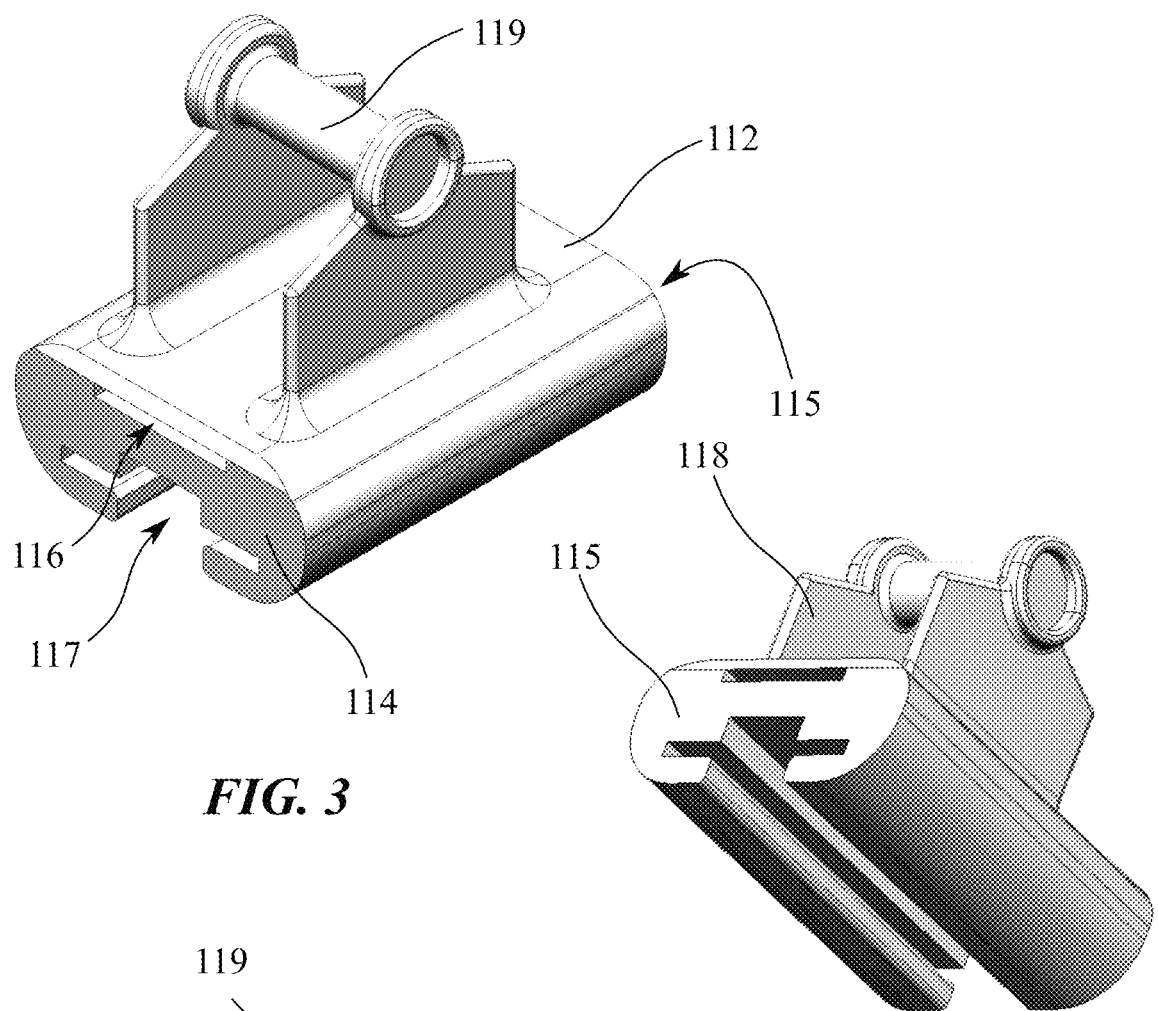
FIG. 3
FIG. 4
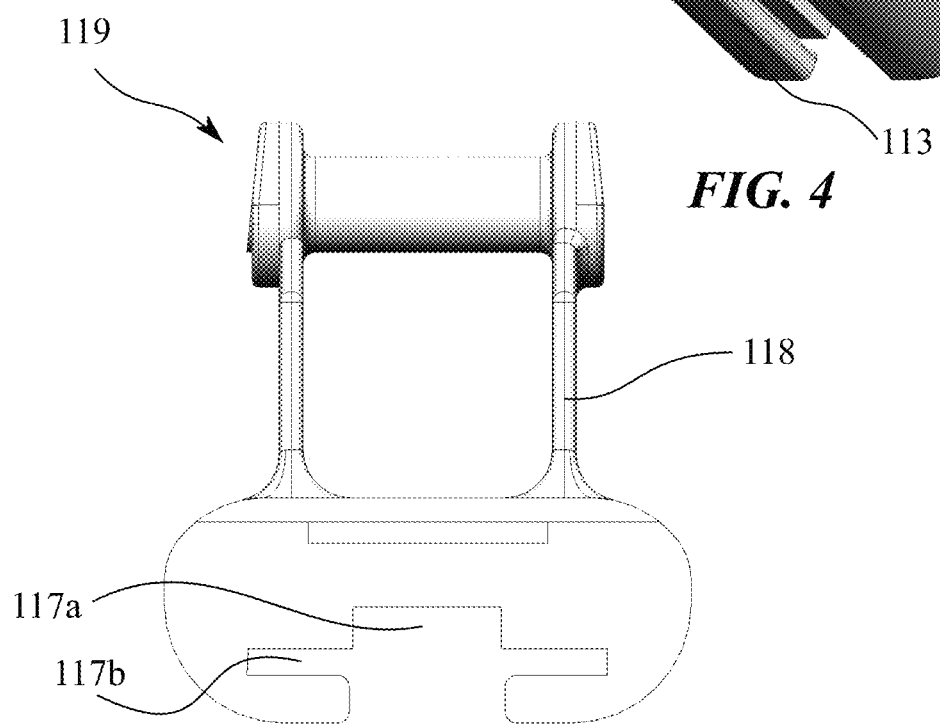
FIG. 5

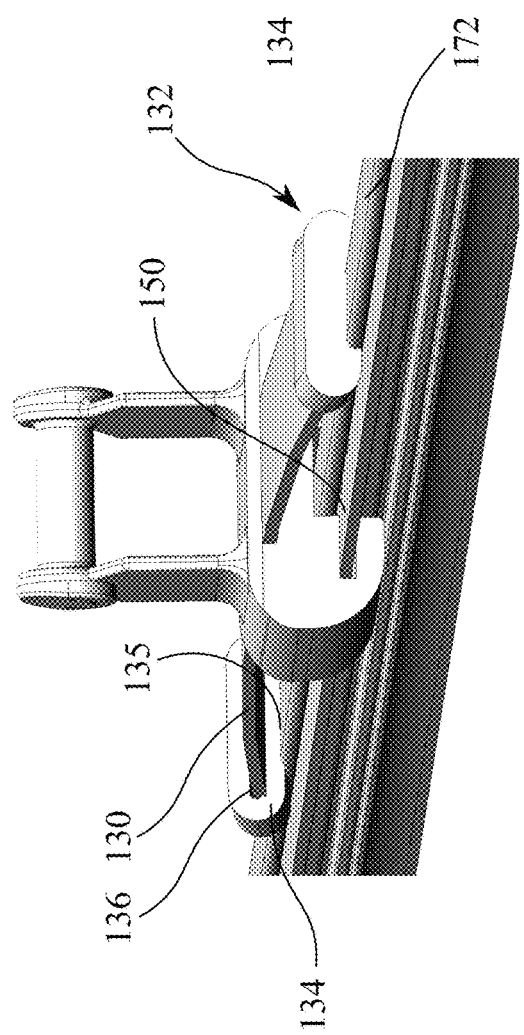
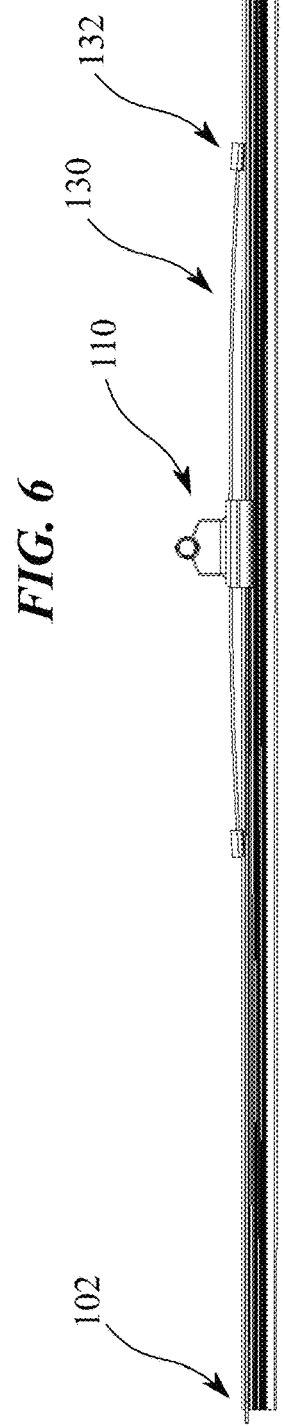
FIG. 6
FIG. 7

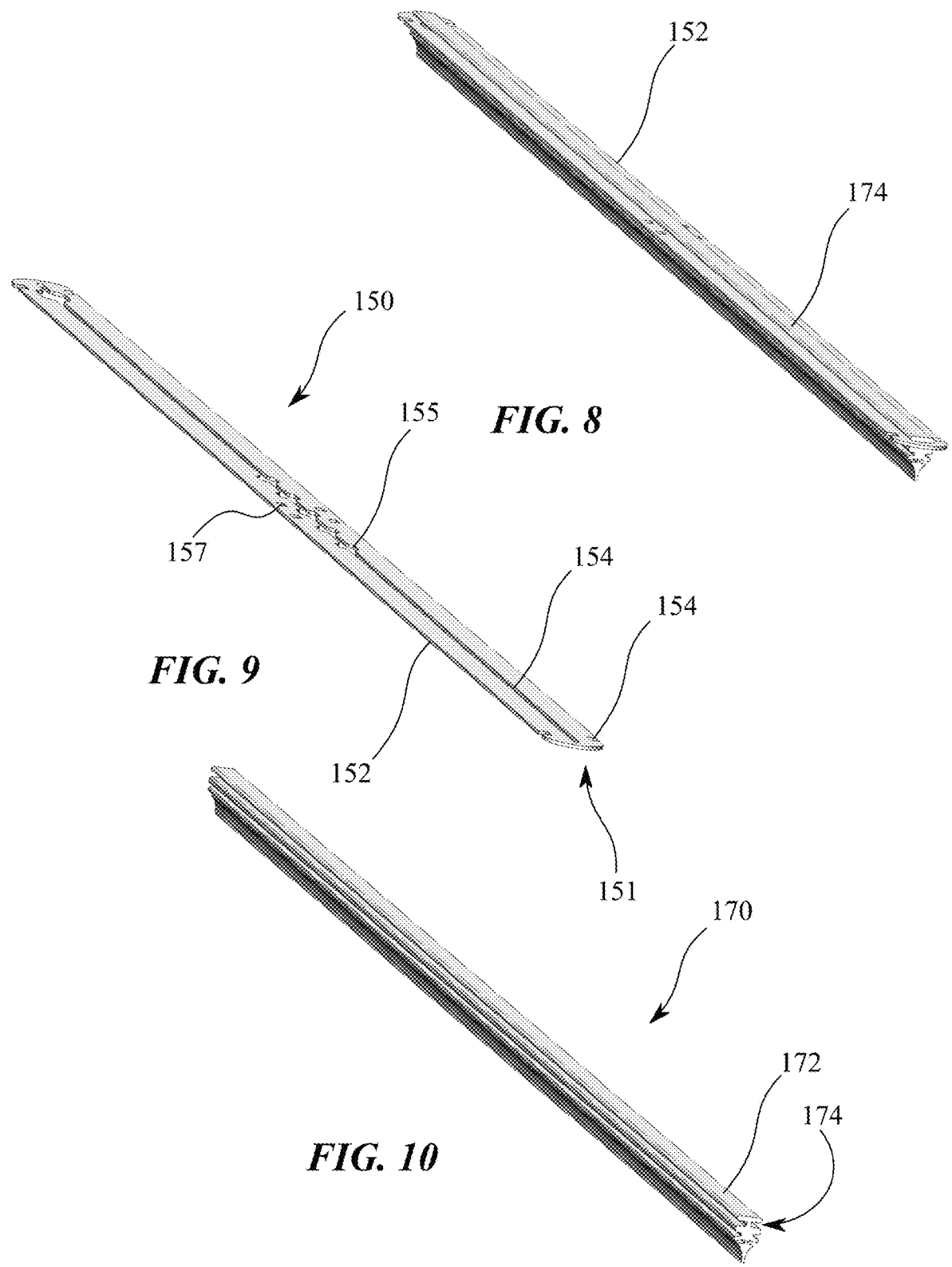

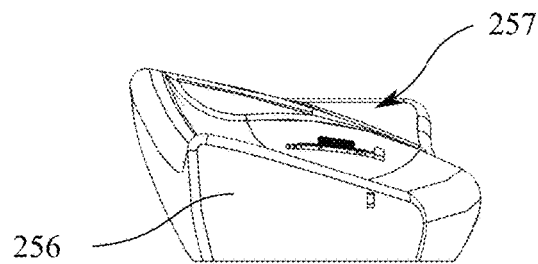
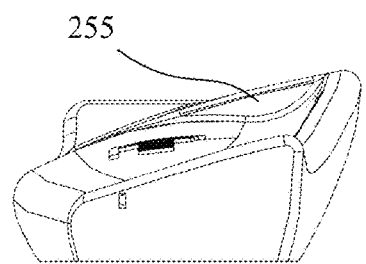
FIG. 20  FIG. 21
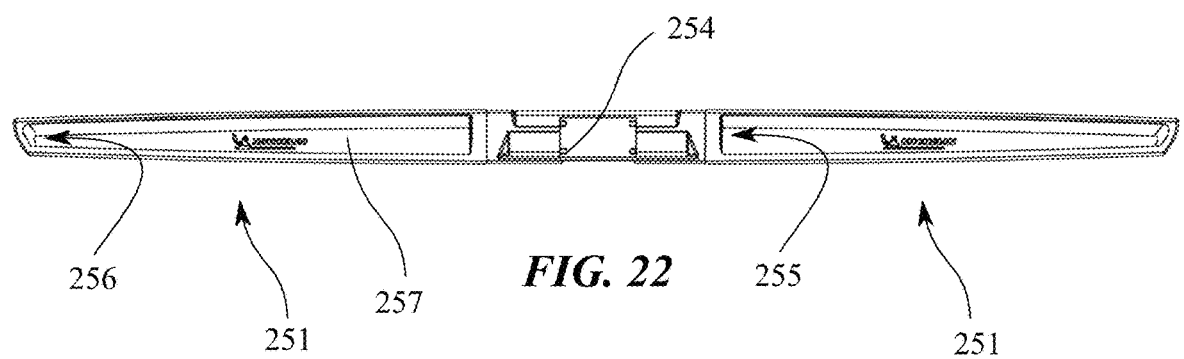
FIG. 22
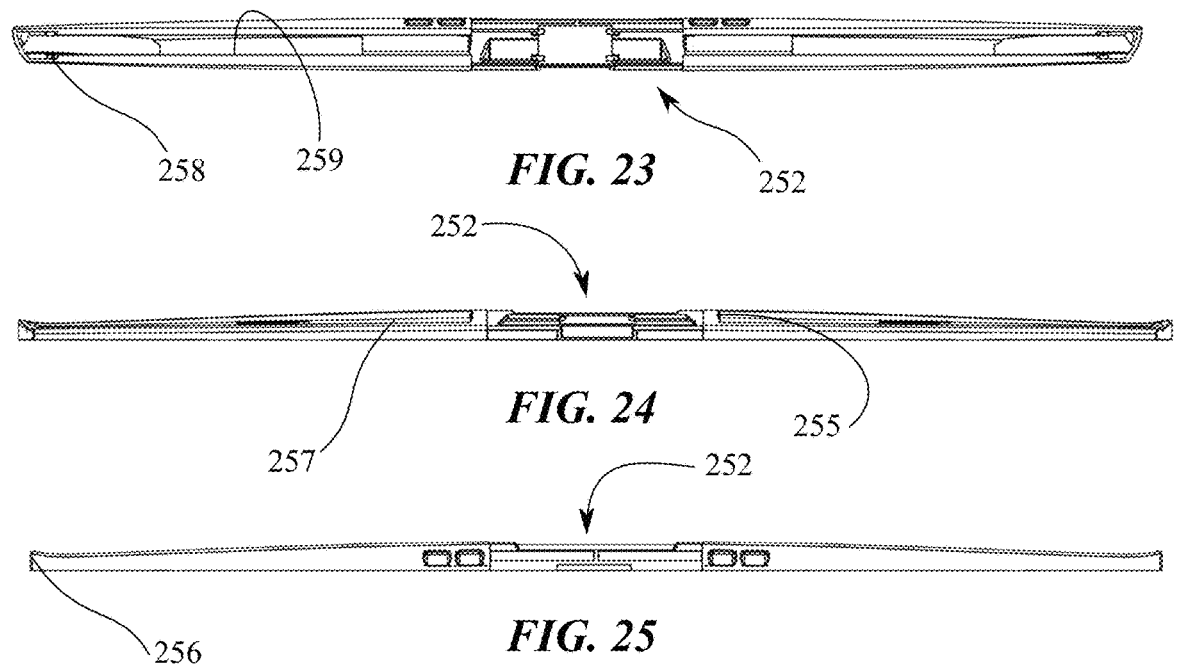
FIG. 23
FIG. 24
FIG. 25

WINDSHIELD WIPER BLADE

CROSS REFERENCE TO RELATED APPLICATIONS

This application claims priority to U.S. Provisional Application No. 63/220,047 filed Jul. 9, 2021 and U.S. Provisional Application No. 63/068,856 filed Aug. 21, 2020, the entire contents of each are hereby incorporated by reference.

FIELD OF THE DISCLOSURE

This disclosure relates generally to wiper blades for use with a vehicle.

BACKGROUND

In an effort to improve upon the traditional, bracketed wiper blade, the beam blade (or flat blade) was developed, keeping a lower profile and generally providing a more uniform distribution than most bracketed wiper blades. U.S. Pat. No. 8,397,341 to Edhe discloses an example beam blade known in the prior art. However, beam blades can have problems with wrapping (i.e. keeping contact between the outer edges of the wiper blade and windshield) when their curvature is too sharp for the windshield. Accordingly, traditional beam blades may be serve well for original equipment (i.e. the wiper blades installed by manufacturers on cars that are designed specifically for that car), but can experience problems on certain vehicles if designed as aftermarket wiper blades (i.e. replacement blades designed to be used on a variety of different windshields where the manufacturer does not know what vehicle the blade will be used on).

As compared to bracketed or framed wiper blades, beam blades offer a relatively even force distribution across the blade. Meaning, the greatest force exerted on the blade occurs at the connection point between the beam blade and the wiper arm, and the normal force is fairly, smoothly distributed longitudinally along the blade with the lowest force being exerted at the longitudinal ends of the blade. However, typical beam blades still experience greater force towards the center of the blade near where the blade connects to the wiper arm. Concentrated force towards the center of blade is a significant source of premature failure of wiper blades, particularly after a significant number of uses.

SUMMARY OF THE DISCLOSURE

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one embodiment, a wiper blade may include a central connection device including an upper passage and a lower passage, an upper beam secured within the upper passage, a lower beam secured within the lower passage, and a wiper strip held by the lower beam. The longitudinal ends of the upper beam may each contact the lower beam as the wiper blade is in operation.

A wiper blade assembly may include an embodiment of a wiper blade as disclosed herein and a wiper connector for connecting the wiper blade with a wiper arm of a vehicle. The connector may be securable with the central connection device of the wiper blade.

BRIEF DESCRIPTION OF THE FIGURES

FIG. 3 illustrates a top perspective view of a connection device of the wiper blade of FIG. 1.

FIG. 4 illustrates a bottom perspective view of the connection device of FIG. 4.

FIG. 5 illustrates a front view of the connection device of FIG. 4.

FIG. 6 illustrates front-side perspective view of the wiper blade of FIG. 1 with an enhanced view around the connection device.

FIG. 7 illustrate a side view of the wiper blade of FIG. 1.

FIG. 8 illustrates a top front perspective view of the lower beam and wiper strip of the wiper blade of FIG. 1.

FIG. 9 illustrates a top front perspective view of the lower beam of the wiper blade of FIG. 1.

FIG. 10 illustrates a top front perspective view of the wiper strip of the wiper blade of FIG. 1.

FIG. 20 illustrates a front view of the cover of the wiper blade of FIG. 13.

FIG. 21 illustrates a rear view of the cover of the wiper blade of FIG. 13.

FIG. 22 illustrates a top view of the cover of the wiper blade of FIG. 13.

FIG. 23 illustrates a bottom view of the cover of the wiper blade of FIG. 13.

FIG. 24 illustrates a side view of the cover of the wiper blade of FIG. 13.

FIG. 25 illustrates an opposite side view of the cover of the wiper blade of FIG. 13.

DETAILED DESCRIPTION OF THE DISCLOSURE

Figure 1:
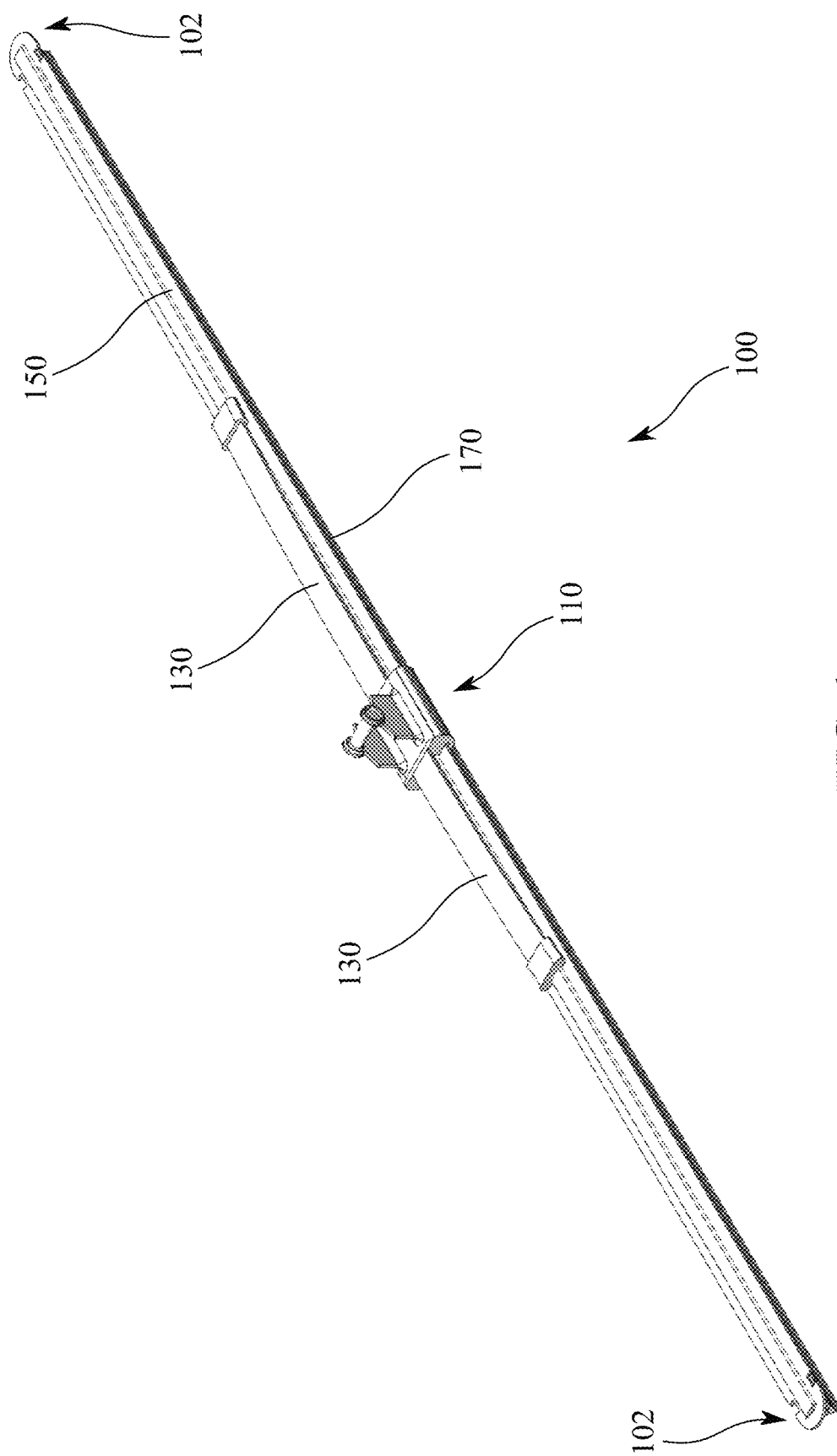
FIG. 1 illustrates a top perspective view of an embodiment of a wiper blade.

The following detailed description and the appended drawings describe and illustrate some embodiments for the purpose of enabling one of ordinary skill in the relevant art to make use the invention. As such, the detailed description and illustration of these embodiments are purely illustrative in nature and are in no way intended to limit the scope of the invention, or its protection, in any manner. It should also be understood that the drawings are not necessarily to scale and in certain instances details may have been omitted, which are not necessary for an understanding of the disclosure, such as details of fabrication and assembly. In the accompanying drawings, like numerals represent like components.

In one embodiment, a wiper blade may include a connection device having an upper passage and a lower passage, an upper beam secured within the upper passage, a lower beam secured within the lower passage, and a wiper strip attached to an end of the upper beam and also attached to the lower beam.

In another embodiment, a wiper blade may include a central connection device having a upper passage, a lower passage, and a connection structure including a rivet. The wiper blade may also include an upper beam secured within the upper passage and a lower beam secured within the lower passage. The wiper blade may also include a wiper strip attached to the lower beam as well as opposing longitudinal ends of the upper beam.

In one embodiment, a wiper blade may include a central connection device including an upper passage and a lower passage, an upper beam secured within the upper passage, a lower beam secured within the lower passage, and a wiper strip held by the lower beam. The longitudinal ends of the upper beam may each contact the lower beam as the wiper blade is in operation.

In further embodiments, the upper beam may be pre-deformed to have a curvature such that the longitudinal ends of the upper beam each contact the lower beam as the wiper blade is at rest. A portion of the longitudinal ends of the upper beam may be parallel to the lower beam. A portion of the longitudinal ends of the upper beam may be acutely angled to the lower beam. Each longitudinal end of the upper passage may be rounded downwards. The upper beam may include a central hole and the connection device includes an upward projection that engages with the central hole. The upper passage may include a plurality teeth projecting laterally into the upper passage and positioned over the upper beam. The lower passage may include an upper portion and a lower portion, the lower beam may be secured in the lower passage, and an upper portion of the wiper strip may be positioned in the upper passage. The central connection device may include a plurality of internal support walls projecting towards the lower passage but terminating before the upper portion.

In further embodiments, a wiper blade may include a cover secured to the connection device and each longitudinal end of the lower beam. The lower beam may include at least one end slot proximate each longitudinal end of the lower beam, and the cover includes at least one end grip for engaging the at least one end slot. The cover may have two longitudinal end portions and a central opening between the end portions. Each end portion of the cover may include a distal end wall and a proximate end wall with a top surface extending between the end walls, and the proximate end wall may have a cross-sectional profile with an airfoil design. The central opening of the cover may include internal central grips for connecting the cover with the central connection device.

Embodiments of a wiper blade assembly may include an embodiment of a wiper blade with a wiper blade connector for connecting the wiper blade with a wiper arm of a vehicle.

Figure 2:
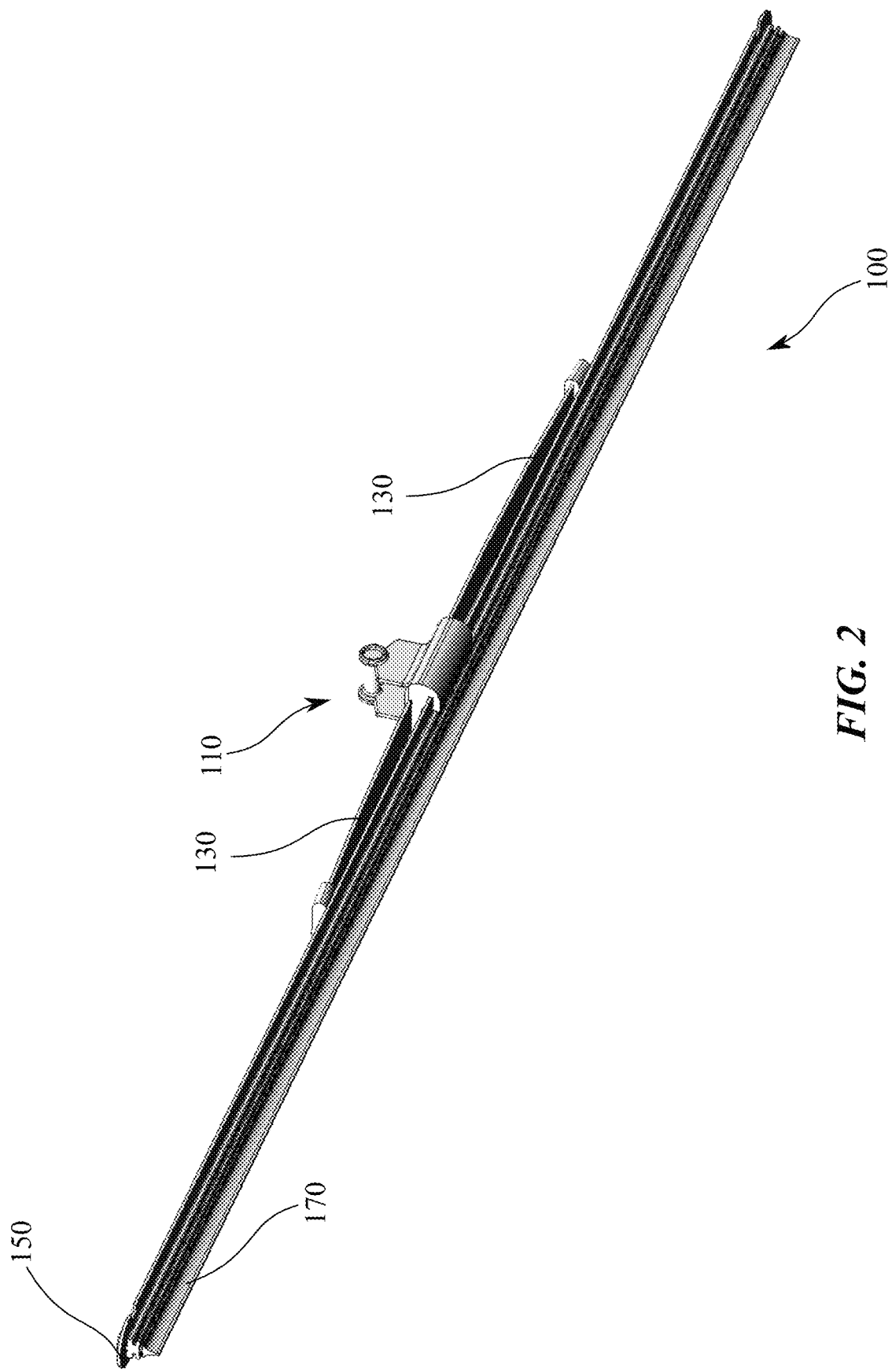
FIG. 2 illustrates a bottom perspective view of the wiper blade of FIG. 1.

Referring now to the Figures, and particularly FIGS. 1 and 2, a wiper blade 100 may include a connection device 110 for connecting wiper blade 100 to a wiper blade connector or a wiper arm of a vehicle. Wiper blade 100 may also include one or more upper beams 130 and one or more lower beams 150 each connected with connection device 110. A wiper strip 170 may be attached to the one or more lower beams 150. Generally, connection device 110 may be located towards the longitudinal center of wiper blade 100. The one or more lower beams 150 may run between the longitudinal ends 102 of the wiper blade.

With reference to FIGS. 3-5, connection device 110 may include a base 111 having a top surface 112, a bottom surface 113 defined on the opposite of the top surface, a front surface 114, and a back surface 115 defined opposite of the top front surface with the front and back surfaces aligned in the longitudinal direction of the wiper blade 110 as a whole, as well as a pair of side surfaces 116 opposite each other and defined in the lateral direction of the wiper blade. Side surfaces 116 may be arcuate to reduce laterally projecting material.

The front surface 114 and back surface 115 may be substantially planar and include an upper passage 116 and a lower passage 117. It is contemplated within the disclosure that passages 116, 117 may pass completely through base 111 between front surface 114 and back surface 115. Alternatively, either upper passage 116 or lower passage 117, or both, could terminate within base 111 thereby creating one or more cavities. Upper passage 116 may receive the one or more upper beams 130 while lower passage may receive the one or more lower beams 150. Upper passage 116 has a substantially rectangular or elliptical cross-section that corresponds to the cross-sectional outer perimeter dimensions of upper beam 130 so as to provide a friction fit between connection device 110 and upper beam 130. Lower passage 117 may mutually accommodate lower beam 150 as well as wiper strip 170. In this regard, lower passage 117 may be open at the bottom surface 115 along the longitudinal length of the bottom surface. Accordingly, lower passage may have a first or upper portion 117a and a second or lateral portion 117b. First portion 117a may be dimensioned to accommodate the upper portion 172 of wiper strip 170. Second portion may be dimensioned to accommodate the lateral edges 152 of the one or more lower beams 150.

Connection device 110 may include a connection structure for connecting wiper blade 100 to a wiper blade connector or a wiper arm of a vehicle. In the illustrated embodiment, this connection structure includes a pair of side walls 118 projecting from top surface 112, and side walls 118 supporting a rivet 119. The rivet 119 may be engageable with a rivet passage on a wiper blade connector or a wiper arm. Rivet 119 may be spaced a clearance distance from top surface 112 so as to permit the wiper blade to rock or pivot about a rivet axis defined longitudinally through rivet 119. Other known or to be developed connection structures are contemplated within the disclosure that permit wiper blade 100 to be connected with a wiper blade connector, or alternatively directly to a vehicle's wiper arm, proximate the top surface 112.

Referring now to FIGS. 6 and 7, one or more upper beams 130 may be a single beam running through upper passage 116 or, alternatively, may be a pair of beams each projecting from opposing longitudinal ends of upper passage 116. The longitudinal ends 132 of upper beam 130 may include a end cover 134 for attaching to an upper portion 172 of wiper strip 170. Upper beam 130 may be pre-formed to obliquely bend towards wiper strip 170. Longitudinal end covers 134 may be provided on the upper beam(s) 130. With or without longitudinal end covers 134, the longitudinal ends 132 of the upper beam(s) 130 may abut, or push against the lower beam(s) 115 and/or the wiper strip 170. during use, the upper beam may provide an additional point of contact for force distribution along the top of the lower beam(s) along portions of a windshield where the curvature flattens out the lower beam(s) 150. The upper beam(s) 130 may be sized such that the longitudinal ends of the upper beam(s) extend a about halfway between connection device 110 and the wiper blade's longitudinal end 102. This attachment point may advantageously assist with the wiper blade's force distribution as it end covers the windshield of a vehicle. The referenced about half way attachment point for end cover 134 may be at a point that is 40-60% the distance between the front or back surface 114, 115 and the wiper blade's longitudinal end 102. It may be advantageous to size the upper beam(s) 130 such that their longitudinal ends 132 extend approximately 25-45% of the distance from the connection device to the longitudinal end 102 of the lower beam(s) 150. The abutment points for one end cover 134 may be at the same distance for one longitudinal side of wiper blade 100 as the opposite longitudinal side, or asymmetric lengths may be chosen. Persons of skill in the art will recognize that the disclosed concepts can be implemented to different optimal solutions for the length of the upper beam(s) 130, depending on the characteristics of the lower beam(s) 150 and the curvature of the windows to be wiped.

Figure 12:
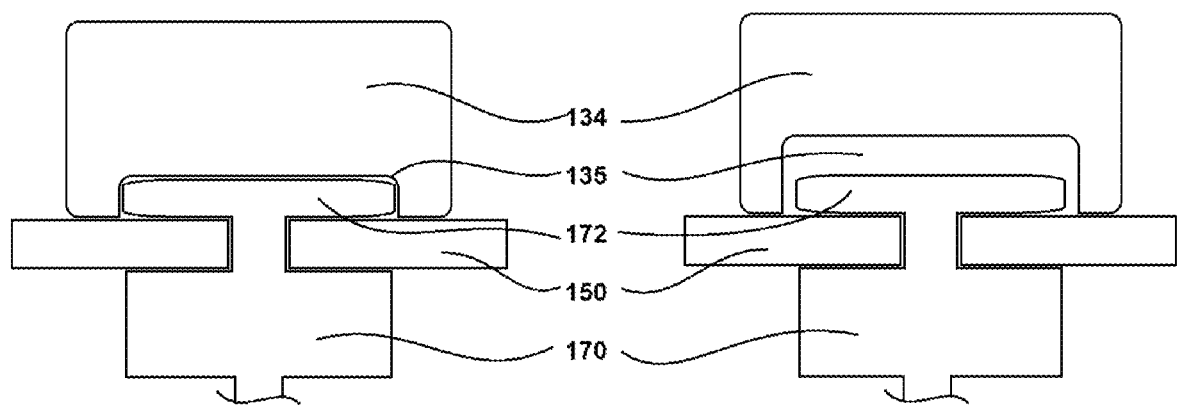
FIG. 12 illustrates a side view of alternative embodiments the lower beam end cover having a lower groove with a close fit and/or a loose or no-contact fit with a wiper strip top portion.
Figure 13:
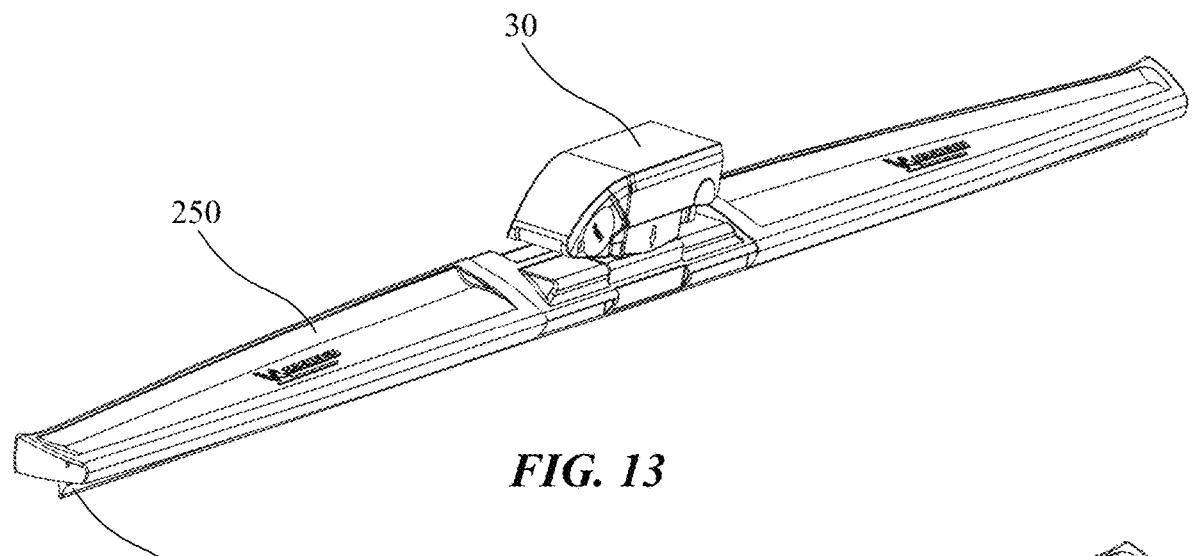
FIG. 13 illustrates a top perspective view of an embodiment of a wiper blade with an attached wiper blade connector.
Figure 14:
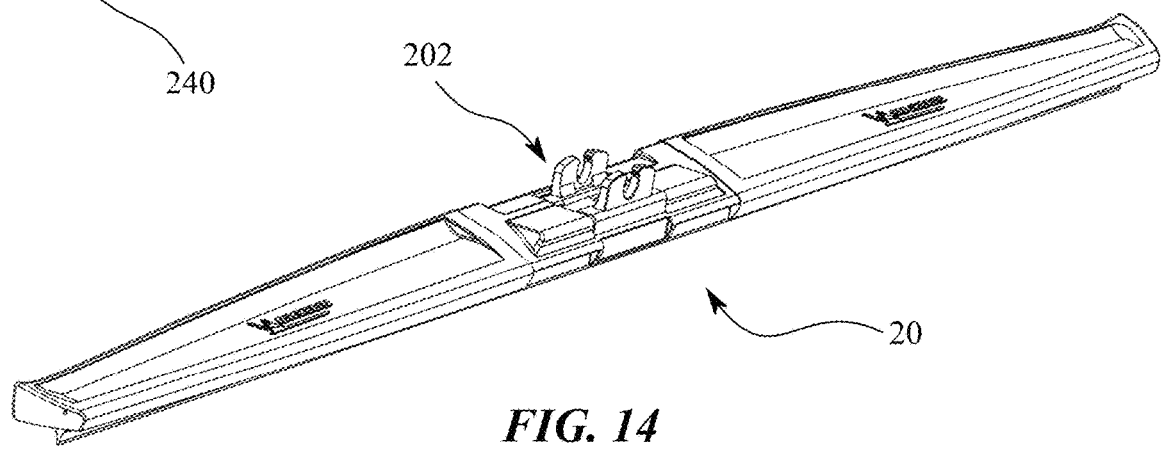
FIG. 14 illustrates a top perspective view of the wiper blade of FIG. 13.
Figure 15:
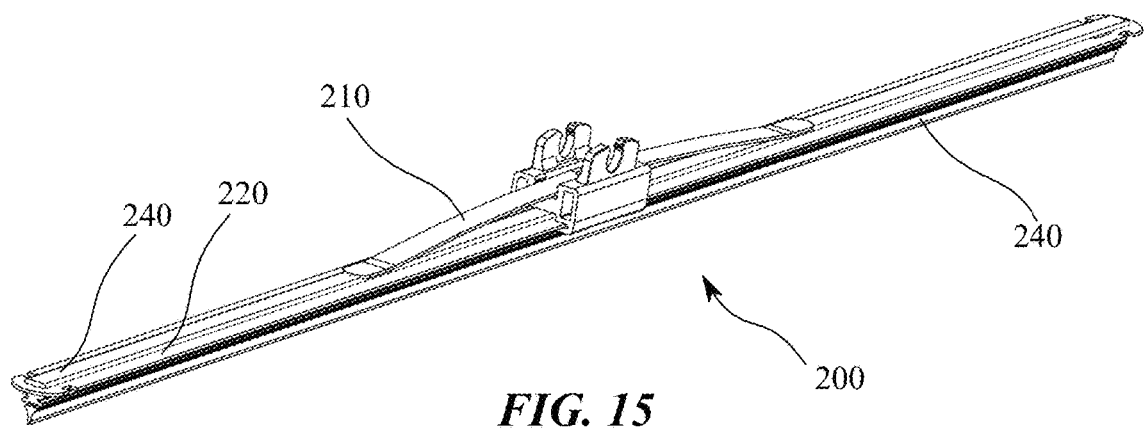
FIG. 15 illustrates a top perspective view of the wiper blade of FIG. 13 with the cover removed.
Figure 16:
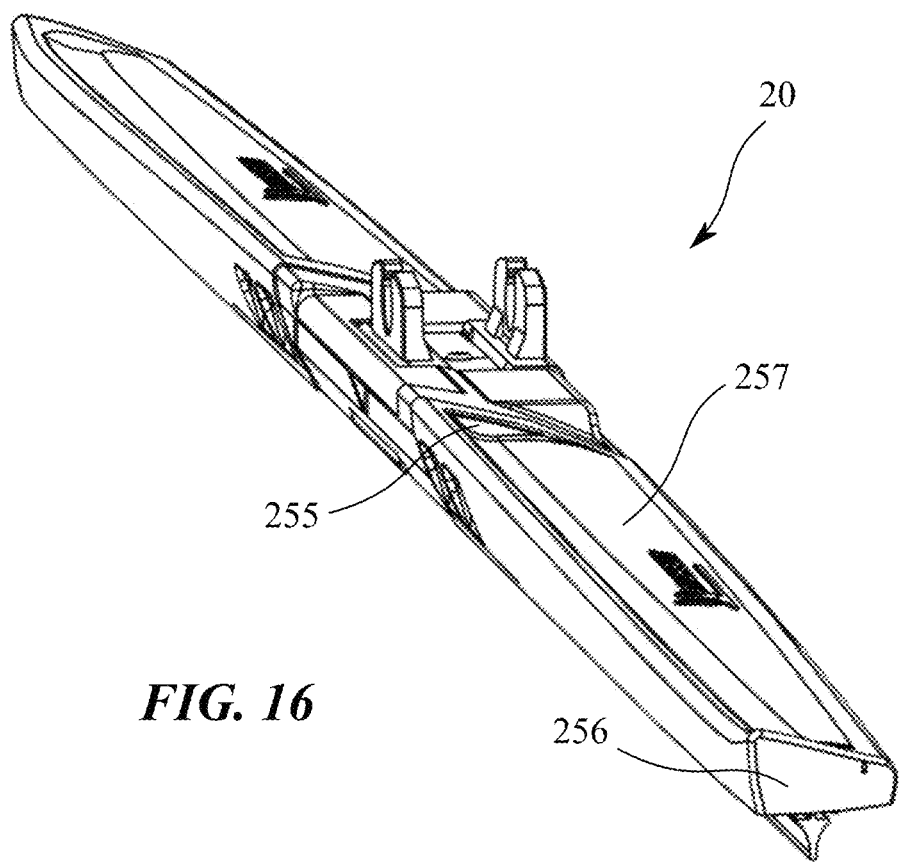
FIG. 16 illustrates a reverse side top perspective view of the wiper blade of FIG. 13.
Figure 17:
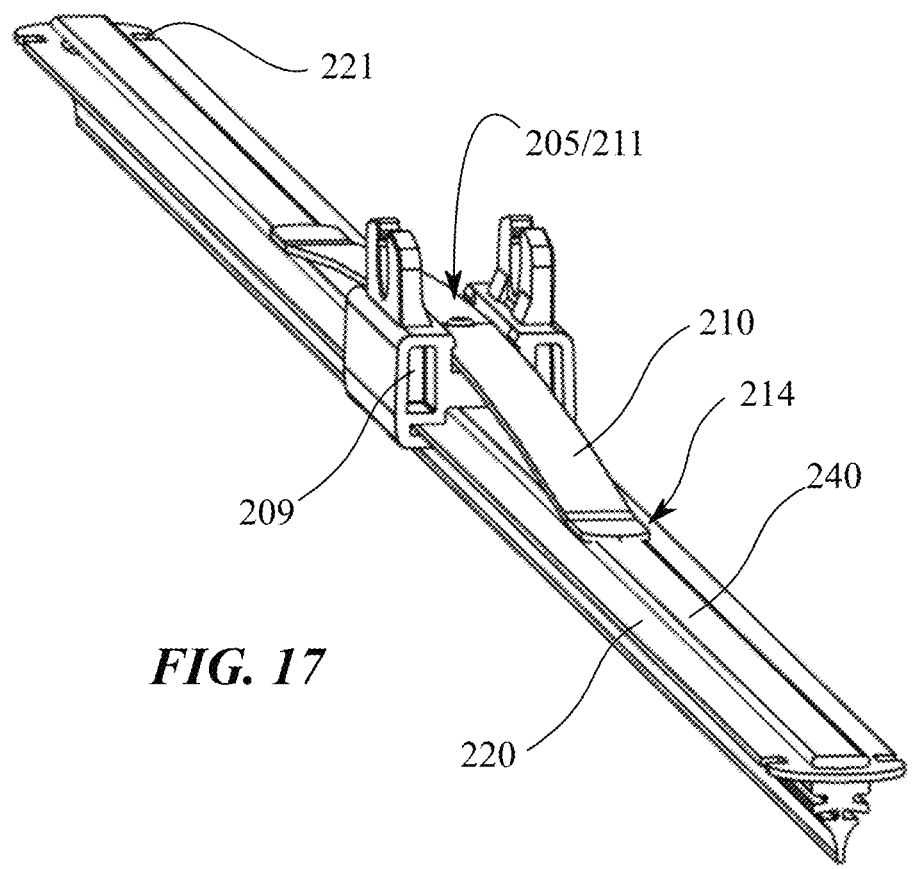
FIG. 17 illustrates a reverse side top perspective view of the wiper blade of FIG. 13 with the cover removed.
Figures 18, 19:
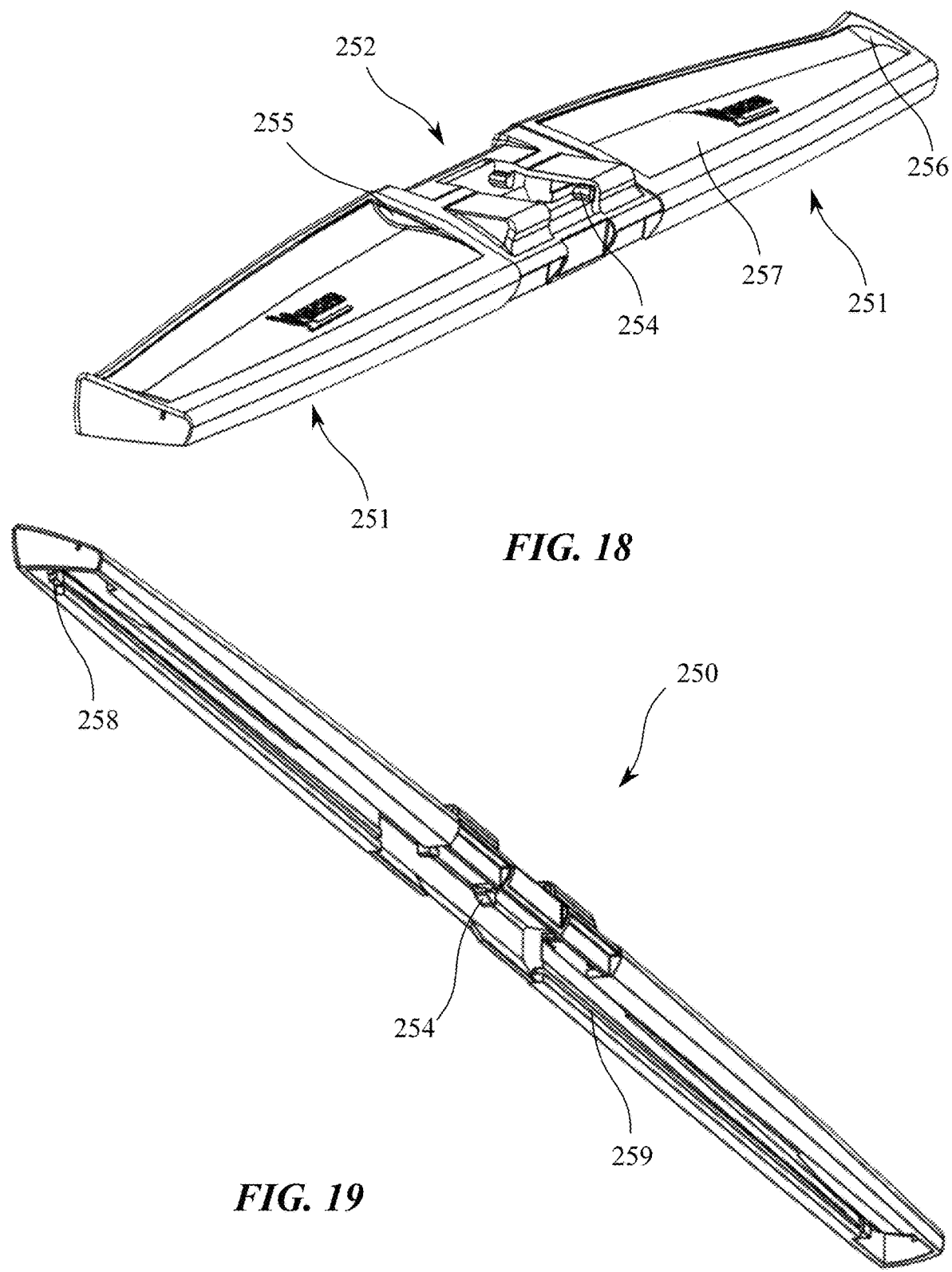
FIG. 18 illustrates a top perspective view of the cover of the wiper blade of FIG. 13.
FIG. 19 illustrates a bottom perspective view of the cover of the wiper blade of FIG. 13.
Figure 26:
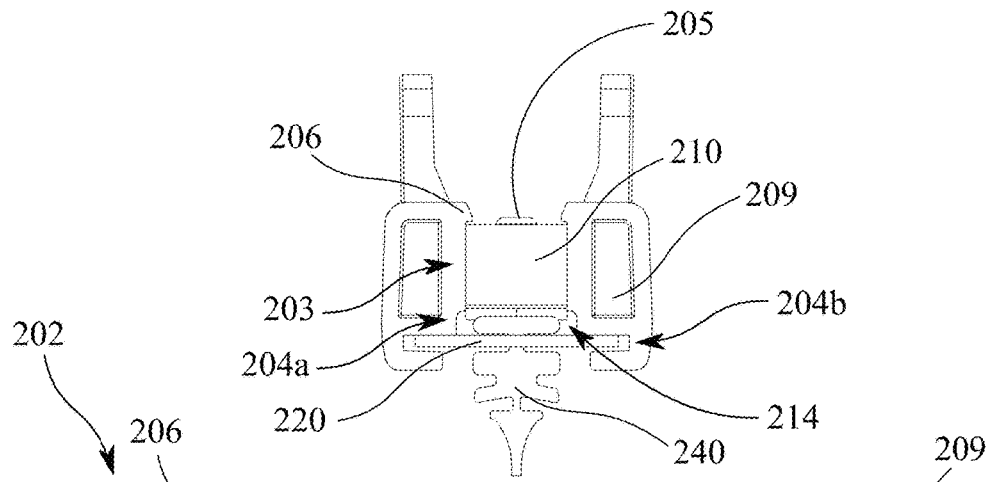
FIG. 26 illustrates a front view of the wiper blade of FIG. 13 with the cover removed, with the rear view appearing the same.
Figure 27:
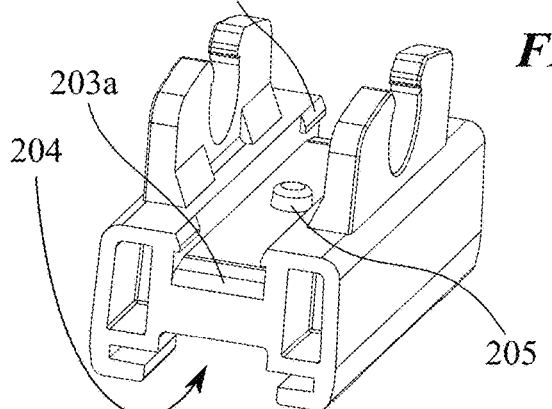
FIG. 27 illustrates a top perspective view of the connection device of the wiper blade of FIG. 13.
Figure 28:
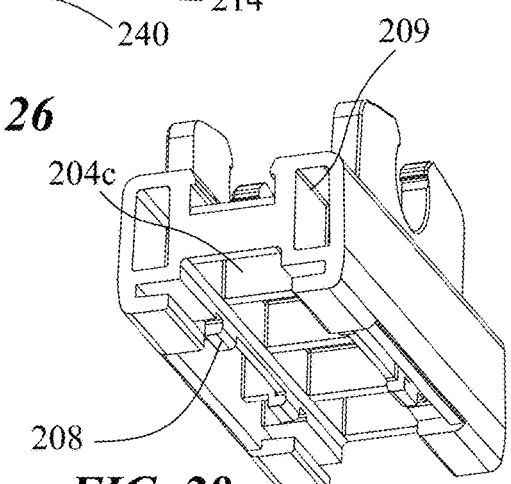
FIG. 28 illustrates a bottom perspective view of the connection device of the wiper blade of FIG. 13.
Figure 29:
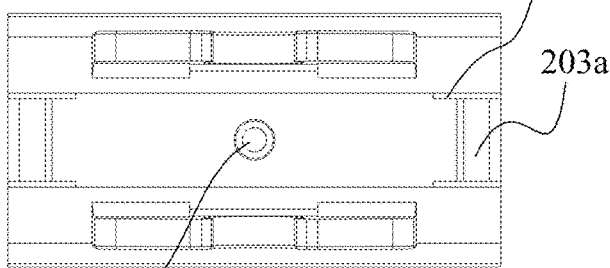
FIG. 29 illustrates a top view of the connection device of the wiper blade of FIG. 13.
Figure 30:
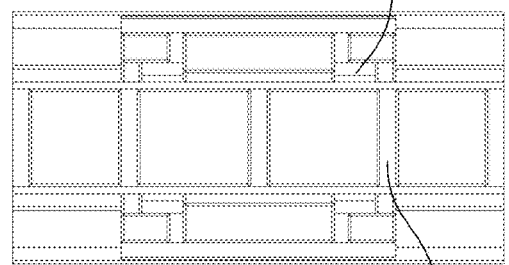
FIG. 30 illustrates a bottom view of the connection device of the wiper blade of FIG. 13.
Figure 31:
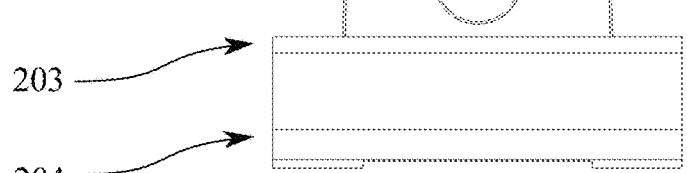
FIG. 31 illustrates a side view of the connection device of the wiper blade of FIG. 13, the opposing side view looking substantially the same.
Figure 32:
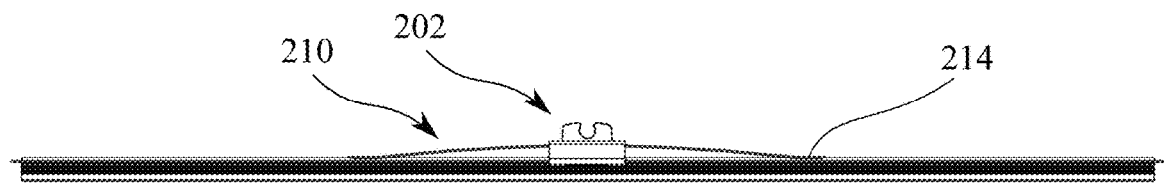
FIG. 32 illustrates a side view of the wiper blade of FIG. 13 with the cover removed, with the opposing side view appearing the same.
Figure 33:
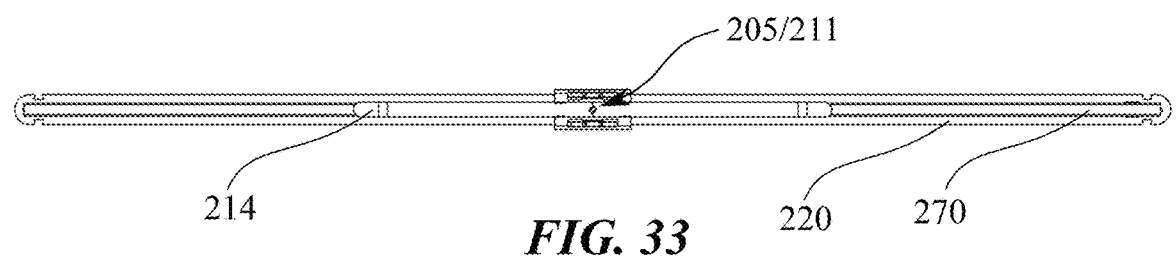
FIG. 33 illustrates a top view of the wiper blade of FIG. 13 with the cover removed.
Figure 34:
FIG. 34 illustrates a bottom of the wiper blade of FIG. 13 with the cover removed.

As shown in greater detail in FIG. 12End covers 134 may each have a lower groove 135 to accommodate close-fit. or alternatively, a loose-fit or a no-contact, interaction with the wiper strip's upper portion 172, depending on the amount of friction desired between the wiper strip's upper portion 172 of the and the end cover 134. The longitudinal ends 132 of upper beam 130 may be inserted into a end cover cavity 136 positioned to face towards connection device 110. Accordingly, end cover 134 may cap or cover the longitudinal end 132 of upper beam 130.

With reference now to FIGS. 8-11, one or more lower beams 150 may run along substantially the entire longitudinal length of wiper blade 100. The wiper strip 170 may also run along substantially the entire longitudinal length of wiper blade 100. Thus, a lower beam longitudinal end 151 may be defined at or proximate the same position as the wiper blade longitudinal end 101. Lower beam 150 may include lateral edges 152 that fit within the second or lower portion 117a of lower passage 117. Lower beam 150 may further include lateral proximate edges 154 that are adjacent wiper strip 170, and more particularly the neck portion 174 of wiper strip 170. Wiper strip notches 155 may be provided along lateral proximate edges 154 to facilitate the attachment or securing of wiper strip 170. Cover notches 156 may be provided proximate the longitudinal ends of lower beam 150 to facilitate engagement with the longitudinal end of a wiper blade cover (not shown). Moreover, the lower beam 150 may have a curved longitudinal end 151 to facilitate insertion of the curved longitudinal end into an internal pocket provided on the longitudinal end of a wiper blade cover. Connection device holes 157 may be provided near the center of lower beam 150 to facilitate the securing of the of lower beam 150 within the lower portion 117a of lower passage 117, for instances by engagement with protrusions provided within lower portion 117a.

Figure 11:
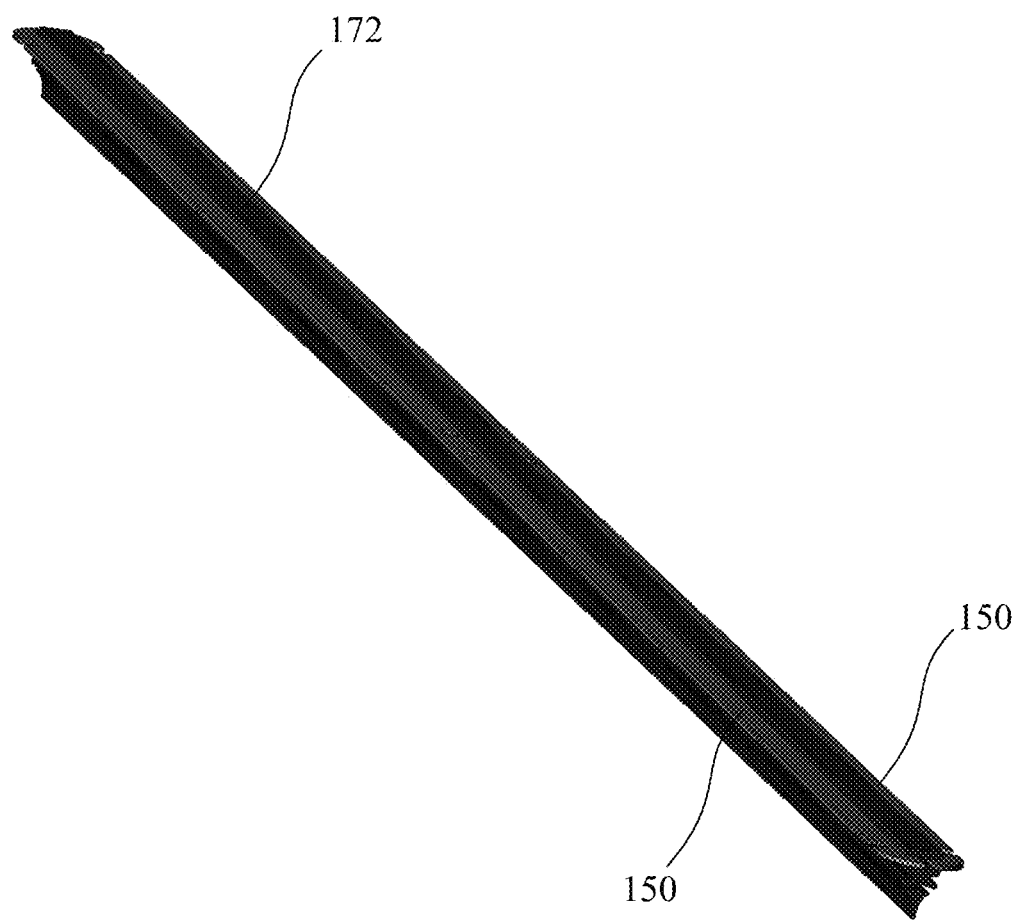
FIG. 11 illustrates a top front perspective view of an embodiment of a pair of lower beams and a wiper strip as part of an embodiment of a wiper blade.

FIGS. 8-10 show an embodiment with one lower beam 150 while FIG. 11 shows an embodiment with a pair of lower beams 150. In the embodiment with a pair of lower beams 150, each elongate lower beam is provided within opposing sides of neck 174 of wiper strip 170. By contrast, the single lower beam 150 embodiment has the curved longitudinal end between either lateral side of the lower beam, and the lateral proximate sides 154 define a central slit.

FIGS. 12-32 illustrate additional embodiments of a wiper blade utilizing a double beam design in accordance with the disclosure. With reference to FIGS. 12-29, a wiper blade 20 may include a force distribution structure 200, a wiper blade cover 250, and a wiper strip 270. Generally, the force distribution center connects to the wiper arm of a vehicle while supporting wiper strip 240, which contacts a vehicle surface such as a windshield. Wiper blade cover 220 covers and protects force distribution structure 200 and wiper strip 240 from the greater environment. A wiper blade connector 30 may be provided to facilitate engagement between force distribution structure 200 and the vehicle wiper arm.

Force distribution structure 200 may include a connection device 202 for connecting wiper blade 20 with a wiper blade connector 30, or directly to a vehicle wiper arm. An upper beam 210, a lower beam 220, and wiper strip 240 may be secured with connection device 202. Upper beam 210 may be secured within an upper passage 203 of connection device 202 while lower beam 220 and wiper strip 240 may be mutually secured within a lower passage 204 of connection device 202.

As shown in this illustrated embodiment, upper passage 203 may be open at a top surface so as to permit a snap fit engagement of upper beam 210 down into upper passage 203 dimensioned as a channel. Upper beam 210 may include a central hole 211 sized and dimensioned to engage with an upward protrusion 205 positioned within upper passage 203. A plurality of teeth 206 may project into upper passage 203 and over upper beam 210 as it is connected within upper passage 203. The illustrated embodiment shows four teeth 206, with one in each corner of upper passage 203, however a greater or fewer number of teeth 206 are contemplated within the disclosure. Thus, upper protrusion 205 and teeth 206 operate to secure a snap-fit connection of upper beam 210 within upper passage 203. Additionally, upper passage 203 may be rounded, tapered, or sloped at a longitudinal end 203a to accommodate the curvature of upper beam 210.

Lower passage 204 may include an upper or first portion 204a and a lower or second portion 204b, with upper portion 204a definitionally positioned closer to upper channel 203 than lower portion 204b. Additionally, the lower portion 204b may be laterally wider than upper portion 204a. Lower portion 204b may be dimensioned to accommodate lower beam 220, which may be secured along wiper strip 240. Upper portion 204a may be dimensioned to receive a top edge 272 of wiper strip 240. Lower passage 204 may be open at its lower end so as to accommodate wiper strip 240. Additionally, a plurality of lower protrusions 208 may project from the lower surface of connection device 202 into a corresponding lower beam central holes 222 of lower beam 220. Internal support walls 204c may also be provided proximate lower passage 204. In the illustrated embodiment, three substantially evenly spaced internal support walls 204c are shown positioned laterally across an underside of connecting device 202. The internal support walls 204c project towards lower passage 204 at or before upper portion 204a so as to provide internal structural support of connection device 202 without impeding or obstructing the access to lower passage 204.

Wiper blade cover 250 may generally have a central opening 252 to accommodate exposure of connection device 202 so that it can connect with a wiper blade connector 30, as shown in the illustrated embodiment, or directly with a vehicle wiper arm. The cover may be further secured with force distribution structure 200 by the insertion of internal central grips 254 into connection device 202, which in the illustrated embodiment occurs at cover cavities 209 provide on the front and rear faces of connection device 202. Wiper blade cover 250 may be secured at its longitudinal ends with internal end grips 258 that project laterally and inwardly at or near the end of cover 250. Each end grips 258 may engage a corresponding end slot 221 provided at or near the longitudinal ends of lower beam 220. Additionally, cover 250 may have an internal ledge or channel 259 dimensioned to receive the lateral edge of lower beam 220. Consequentially, cover 250 may be securable with force distribution structure 200 by connecting with connection device 202, lower beam 220, or both.

Cover 250 may be advantageously designed with aerodynamic features in order to improve force distribution over wiper blade 20. Cover 250 may have a center portion including central opening 252 as well as two longitudinal end portions 251. The center and end portions of cover 250 may be a single, flexible piece, as shown in the illustrated embodiment, or may be interlocking separate pieces. End portions 251 may have proximate longitudinal wall 255 and distal longitudinal wall 256. Proximate longitudinal wall may have a lateral, cross-sectional profile with an airfoil design. The lower surface of the airfoil cross-sectional profile may correspond with a top surface 257 of the end portion 251 extending between end walls 255, 256. The underside of cover 250 may maintain the same shape or contouring as top surface 257. This airfoil design of end portions 251 may result in improved pressure differentials experienced by wiper blade 20 when in use on a vehicle. For example, when the vehicle is travelling at a high velocity, an upwards force is experienced on the underside of wiper blade 20. This lift force may detrimentally separate all or a portion of wiper strip 270 from contact surface the wiper blade is meant to clean. Thus, introduction of this cover may benefit operation of wiper blade 20 may introducing a superior pressure differential between the top and underside surface cover 250 resulting in less lift experienced on wiper blade 20 during operation. Moreover, end walls 255, 256 may project above top surface 257 thereby trapping or holding downward force wind that is displayed longitudinally along top surface 257, particularly towards proximal end wall 256. As a result, improved downwards wind force is experienced at proximal end wall 256 which further promotes decentralized force distribution along wiper blade 20.

Superior pressure distribution may also be achieved over traditional single beam blades due to the introduction of the dual beam design. Upper beam 210 is shown as bent, however embodiments within the disclosure include both straight and pre-deformed upper beams. Longitudinal ends 214 of upper beam 210 may contact a top surface 276 of wiper strip 270. In operation, as wiper strip 270 experiences deformation against the curvature of the windshield or other vehicle surface, a deformation occurs along the force distribution structure 20. Contact made by upper beam 210 provides an additional force translation point along force distribution structure 200 thereby dispersing the force longitudinally along force distribution structure 200.

Figure 35:
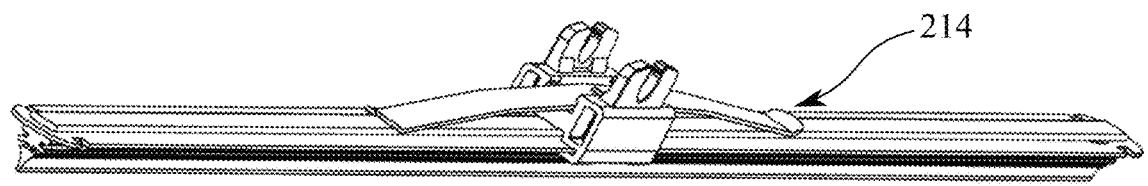
FIG. 35 illustrates a top perspective view of an embodiment of a wiper blade without a cover.
Figure 36:
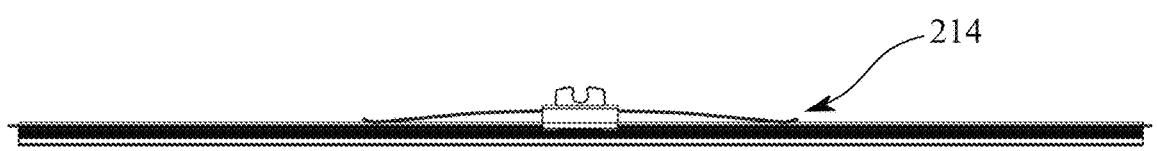
FIG. 36 illustrates a side view of the wiper blade of FIG. 35 without a cover.
Figure 37:
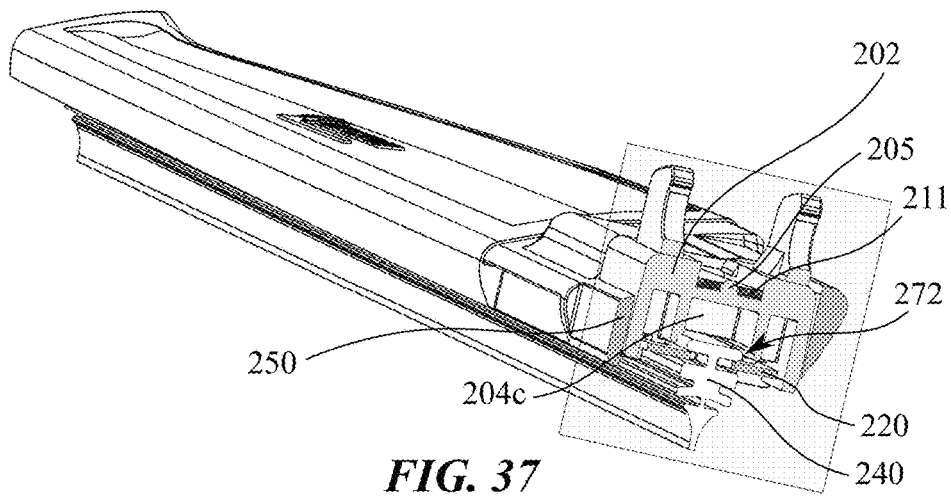
FIG. 37 illustrates the mid-point lateral cross-section of the wiper blade of FIG. 13 from a front perspective view.
Figure 38:
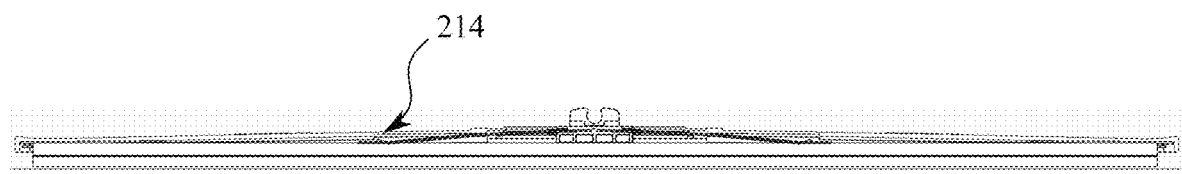
FIG. 38 illustrates the mid-point longitudinal cross-section of the wiper blade of FIG. 13 from a side view.
Figure 39:
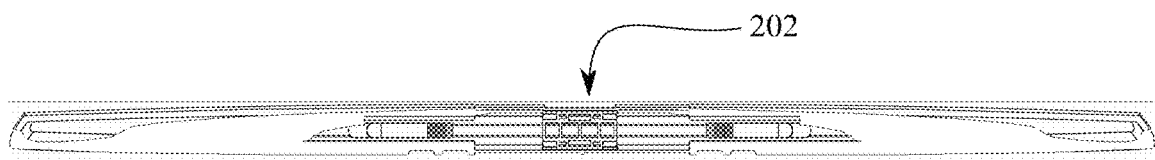
FIG. 39 illustrates the mid-point longitudinal cross-section of the wiper blade of FIG. 13 from a top view.
Figure 40:
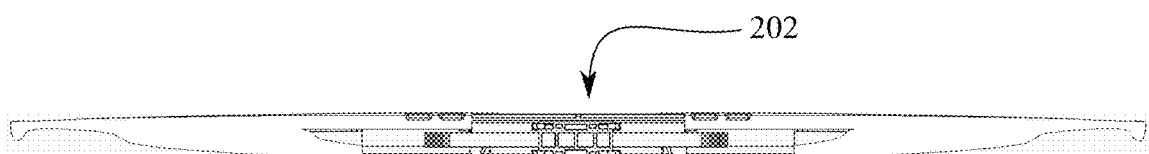
FIG. 40 illustrates the mid-point longitudinal cross-section of the wiper blade of FIG. 13 from a bottom view.

FIGS. 35 and 36 illustrate an additional embodiment to upper beam 210a than what is shown in FIGS. 13-34. In one embodiment, as shown for example in FIGS. 17 and 27, longitudinal ends 214 of upper beam 210 are flat and extend substantially parallel across the top surface of wiper strip 270. By comparison, in the embodiment shown in FIG. 30 the longitudinal ends 214 turn upwards at an acute angle with respect to the top surface of wiper strip 270. Consequentially, the embodiment shown in FIG. 17 with flat ends 214 has a larger contact surface area with strip 270 than the embodiment shown in FIG. 30.

FIGS. 37-40 illustrate various mid-point cross sections, taken either laterally or longitudinally, of an embodiment of an assembled wiper blade so as to depict internal structural.

Figure 41:
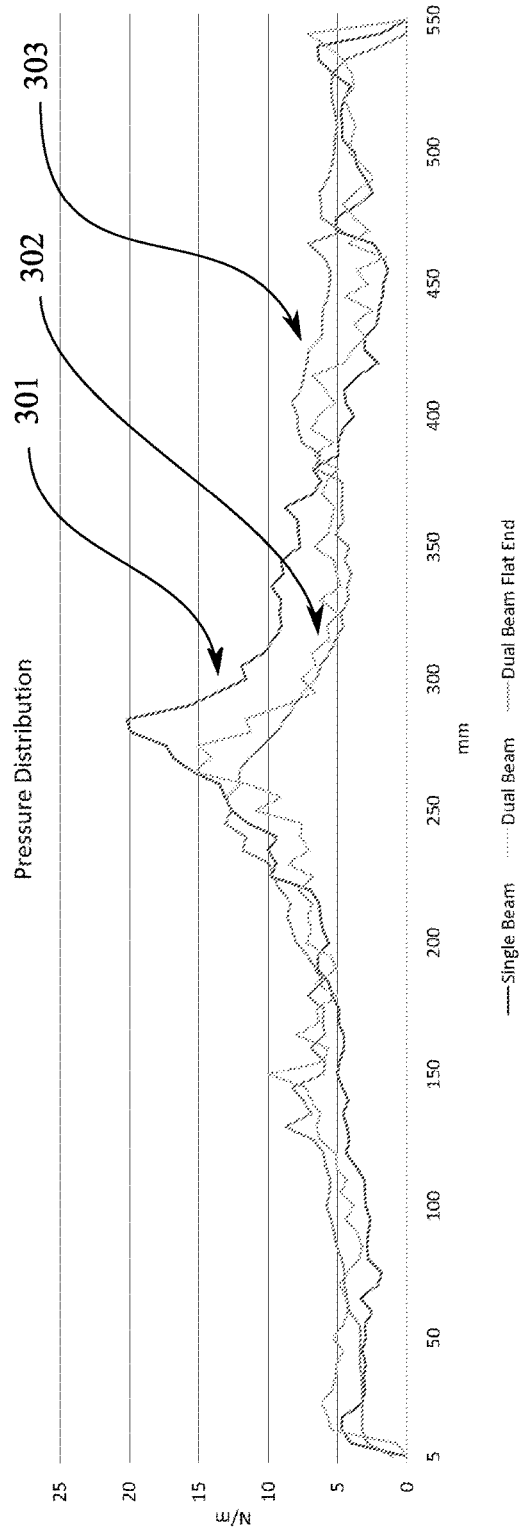
FIG. 41 illustrates a pressure distribution graph comparing a single beam blade, the wiper blade embodiment of FIG. 13, and the wiper blade embodiment of FIG. 35.
Figure 42:
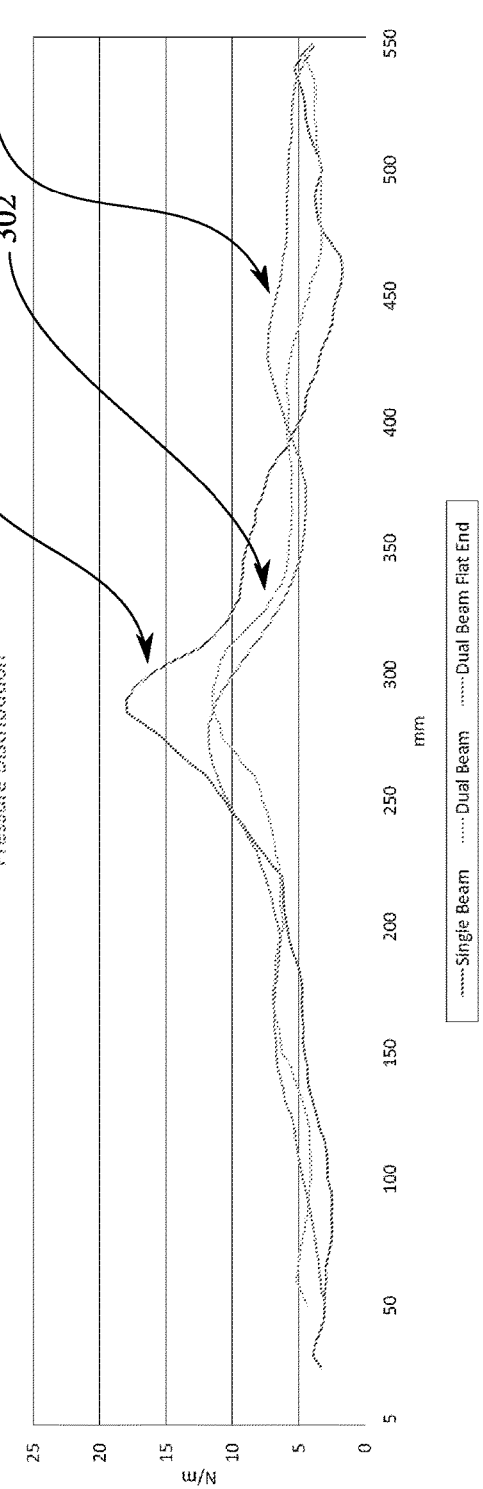
FIG. 42 illustrates a smoothed version of the pressure distribution graph of FIG. 41.

FIGS. 41 and 42 illustrate graphs showing the change in the force distribution experienced along wiper blade 20 between a traditional single beam blade 300, a double beam blade in accordance with the disclosure with the upper beam having flat longitudinal ends 301, and a double beam blade in accordance with the disclosure with the upper beam having angled longitudinal ends 302. A person of ordinary skill in the art will appreciate the double beam blade embodiments demonstrate a force distribution that is more flat and less concentrated towards the center of the blade than the traditional single beam blade. Between the two embodiments of the double beam blade, the embodiment with flat ends 214 demonstrated better force distribution than the embodiment with the angled ends 214.

It should be appreciated that various embodiments of upper beam are contemplated within the disclosure. The illustrated embodiments depict a capped-end upper beam 150, a flat-end 214 to upper beam 210, and a slopped-end 214 upper beam. Each embodiment is operable to accomplish a force distribution as visually shown in the graphs for 41 and 42. Although advantages of the various illustrated embodiments are either described herein or may be apparent to person of ordinary skill in the art, additional non-illustrated embodiments are further contemplated within the disclosure that may also accomplish an improved force distribution. For example, it would be within the scope of the disclosure to design a longitudinal end of upper beam to curl, to have multiple contact points with lower beam 220 or wiper strip 270, or to have varying lateral dimensions.

The descriptions set forth above are meant to be illustrative and not limiting. Various modifications to the disclosed embodiments, in addition to those described herein, will be apparent to those skilled in the art from the foregoing description. Such modifications are also intended to fall within the scope of the concepts described herein. The disclosures of each patent, patent application, and publication cited or described in this document are hereby incorporated herein by reference, in their entireties.

The foregoing description of possible implementations consistent with the present disclosure does not represent a comprehensive list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims.

What is claimed:

1. A wiper blade comprising:
   a central connection device including an upper passage and a lower passage;
   an upper beam secured within the upper passage, the upper passage having longitudinal ends, each of which is rounded downwards;
   a lower beam secured within the lower passage; and
   a wiper strip held by the lower beam, wherein longitudinal ends of the upper beam each contact the lower beam as the wiper blade is in operation.

2. The wiper blade of claim 1, wherein the upper beam includes a central hole and the connection device includes an upward projection that engages with the central hole.

3. The wiper blade of claim 1, wherein the upper passage includes a plurality teeth projecting laterally into the upper passage and positioned over the upper beam.

4. The wiper blade of claim 1, wherein the lower passage includes an upper portion and a lower portion, the lower beam is secured in the lower portion of the lower passage, and an upper portion of the wiper strip is positioned in the upper portion of the upper passage.

5. The wiper blade of claim 4, wherein the central connection device includes a plurality of internal support walls projecting towards the lower passage but terminating before the upper portion.

6. The wiper blade of claim 1 further comprising a cover secured to the connection device and each longitudinal end of the lower beam.

7. The wiper blade of claim 6, wherein the lower beam includes at least one end slot proximate each longitudinal end of the lower beam, and the cover includes at least one end grip for engaging the at least one end slot.

8. The wiper blade of claim 6, wherein the cover has two longitudinal end portions and a central opening between the end portions.

9. The wiper blade of claim 8, wherein each end portion of the cover includes a distal end wall and a proximate end wall with a top surface extending between the end walls, and the proximate end wall has a cross-sectional profile with an airfoil design.

10. The wiper blade of claim 8, wherein the central opening of the cover includes internal central grips for connecting the cover with the central connection device.

11. A wiper blade comprising:
    a central connection device including an upper passage and a lower passage, the upper passage includes an upward projection, the lower passage including an upper portion and a lower portion;
    an upper beam including a central hole, the upper beam secured within the upper passage by the central hole engaging the upward projection;
    a lower beam secured within the lower portion of the lower passage, the lower beam including at least one end slot proximate each longitudinal end of the lower beam;
    a wiper strip held by the lower beam, an upper portion of the wiper strip positioned in the upper portion of the lower passage; and
    a cover having two longitudinal end portions and a central opening between the end portions, each end portion including an internal end grip for engaging one of the end slots of the lower beam, and the central opening including internal central grips for connecting the cover with the central connection device,
    wherein the longitudinal ends of the upper beam each contact the lower beam as the wiper blade is in operation.

12. The wiper blade of claim 11, wherein each end portion of the cover includes a distal end wall and a proximate end wall with a top surface extending between the end walls, and the proximate end wall has a cross-sectional profile with an airfoil design.

13. The wiper blade of claim 11, wherein a portion of the longitudinal ends of the upper beam are parallel to the lower beam.

14. The wiper blade of claim 11, wherein a portion of the longitudinal ends of the upper beam are acutely angled to the lower beam.

15. The wiper blade of claim 11, wherein the upper beam is pre-deformed to have a curvature such that the longitudinal ends of the upper beam each contact the lower beam as the wiper blade is at rest.

* * * * *